United States Patent [19]

Iura et al.

[11] Patent Number: 5,206,462
[45] Date of Patent: Apr. 27, 1993

[54] FLAT MULTICORE WIRE AND METHOD OF FORMING THE SAME WIRE

[75] Inventors: Kazuo Iura; Yoshiaki Yamano; Kazuhito Saka, all of Mie, Japan

[73] Assignee: Sumitomo Wiring System Ltd., Mie, Japan

[21] Appl. No.: 903,960

[22] Filed: Jun. 26, 1992

Related U.S. Application Data

[62] Division of Ser. No. 728,503, Jul. 11, 1991.

[30] Foreign Application Priority Data

| Jul. 13, 1990 | [JP] | Japan | 2-186575 |
| Mar. 6, 1991 | [JP] | Japan | 3-65386 |
| Mar. 15, 1991 | [JP] | Japan | 3-76740 |
| May 20, 1991 | [JP] | Japan | 3-143782 |

[51] Int. Cl.⁵ .............................................. H01B 7/08
[52] U.S. Cl. .................. 174/117 F; 174/117 A; H01B/7/08
[58] Field of Search ............ 174/117 F, 117 R, 117 A, 174/117 FF; 81/9.51; 29/564.4, 877; 156/55

[56] References Cited

U.S. PATENT DOCUMENTS

| 3,346,897 | 10/1967 | Nelson | 81/9.51 X |
| 3,385,140 | 5/1968 | Carpenter et al. | 81/9.51 |
| 3,895,426 | 7/1975 | Papsdorf | 29/427 |
| 4,154,977 | 5/1979 | Verma | 174/117 F |
| 4,455,745 | 6/1984 | Toeppen | 81/9.51 X |
| 4,597,176 | 7/1986 | Shields et al. | 81/9.51 X |
| 4,616,717 | 10/1986 | Luetzow | 174/117 F |
| 4,931,598 | 6/1990 | Calhoun et al. | 174/117 F |

FOREIGN PATENT DOCUMENTS

| 48691 | 11/1976 | Japan . | |
| 14891 | 2/1977 | Japan | 174/117 F |
| 10702 | 1/1980 | Japan . | |
| 24441 | 6/1981 | Japan . | |
| 58412 | 3/1986 | Japan . | |
| 194413 | 12/1988 | Japan . | |
| 196517 | 12/1988 | Japan . | |
| 2-17802 | 8/1989 | Japan | 174/117 F |

*Primary Examiner*—Morris H. Nimmo
*Attorney, Agent, or Firm*—Sughrue, Mion, Zinn, Macpeak & Seas

[57] ABSTRACT

The present invention improves the quality and productivity in a coating peeling-off process in which the coating at an intermediate portion along the length of a wire is peeled off in order to expose a conductor inside the coated wire, while enabling coatings at intermediate portions along the length of multicore wires or small-diameter wires to be peeled off.

In a primary process, a heating jig 16 is brought into press contact with the upper half portion of the coating of the peeling-off designated portion at an intermediate potion along the length of coated wires 1 so as to press down the coating downwardly relative to the transverse direction of the wires, whereby a coating peeled-off portion 20 in which a part of conductors 2 is exposed is formed. Afterwards, in a secondary process, the coating of the coating peeled-off portion 20 is cut and press held at the ends thereof by cutting and peeling-off blades 13 adapted to operate from the ends of the coating peeled-off portion 2 toward the center thereof so as to remove the coating of the coating peeled-off portion 20, whereby a coating peeled-off portion 131 is formed.

1 Claim, 12 Drawing Sheets

FLAT MULTICORE WIRE AND METHOD OF FORMING THE SAME WIRE

This is a divisional of application Ser. No. 07/728,503 filed Jul. 11, 1991.

BACKGROUND OF THE INVENTION

1. Field of the Invention

The present invention relates to a flat multicore wire for use for wiring between flexible printed circuit boards and a method of forming the same wire, and more particularly to a structure for the end portion of such a flat multicore wire and a method of forming the end portion of the same wire.

2. Statement of the Prior Art

There are known a number of types of flat multicore wires, some of which are disclosed in the official gazettes of Japanese Utility Laid-Open Nos. 196517/1988, 194413/1988 and so forth. The gist of the above official gazettes is a flat multicore wire having an end structure in which round wires are disposed in parallel in a plate-like fashion at predetermined intervals, in which coatings of the respective wires are peeled off at the end portion by a slightly short distance so as to expose conductors threat, in which pieces of connecting tape are applied over the top and bottom surfaces of the coated portion of a group of round wires along the proximal end portion of the exposed conductors (hereinafter, simply referred to as a conductor) so as to secure the parallel posture of the group of wires, thereby allowing the conductors to act as a contact portion which is brought into contact with another element. There is disclosed another type of a flat multicore wire in which a sheath body is provided at an intermediate portion of the conductors along the length thereof for holding a group of conductors altogether with a view to preventing bending of the known conductors.

Of the above two types of prior art flat multicore wires, in a flat multicore wire of the former type, since the rigidity of the conductors projecting in a cantilever-like fashion is not sufficient, the conductors are easy to "bend or buckle" due to insertion resistance generated when a connector is fitted thereover. In order to compensate for the insufficient rigidity even to a small extent, wires to be used are limited to tinted wires or solid ones in terms of construction, and thus since stranded wires are not suitable for use with a flat multicore wire of this type, the flexibility of the whole wire including the contact portion is not good. Thus, the flat multicore wire of the former type has a drawback in that it is not suitable for applications where connections are made while the wire is being bent and/or where the wire is repeatedly bent at the intermediate portions along the length thereof.

In a flat multicore wire of the latter type in which the rigidity of the conductors is intended to be improved, although the "bending or bucking" inherent in the flat multicore wire of the former type is able to be prevented, when inserted into a connector, the sheath body also has to be inserted together with the conductors, and this requires a great magnitude of insertion force, resulting in a remarkably low operating efficiency.

Means for bonding a conductor to an insulating film or the like utilized in forming a conventional tape-like wire are classified into the following three methods. First and second methods are disclosed in the official gazettes of Japanese Utility Model Publication No. 48691/1976 and Japanese Patent Laid-Open No. 10702/1980, respectively. The first method comprises the steps of "providing a thermoplastic or thermosetting bonding layer on an insulating film or the like, and fusion bonding a conductor to the insulating film or the like." The second method comprises the step of "bonding an insulating film or the like to a conductor by means of an energy ray-setting resin." A third method, which is disclosed in the U.S. Pat. No. 4,931,598, comprises the step of "bonding an insulating film or the like to a conductor by means of a cold-setting adhesive."

Among the above conventional bonding means, although the first method is common and widely propagated, in a case where a thermoplastic bonding layer is used, the layer gets plasticated depending on the temperature of the environment in which it is used, and therefore there is a risk of the portion performing the bonding function running off. Moreover, there is a drawback to applying a thermoplastic or thermosetting bonding layer on a round conductor which cannot provide a wide bonding area thereon in that sufficient bonding force cannot be obtained.

Furthermore, although the second and third methods can provide strong bonding force, it takes a long time to complete bonding, and facilities exclusively used for applying adhesive is required. Thus, these two methods also have drawbacks that costs are increased, and that productivity is decreased.

There are a number of known examples of an intermediate peeling-off method for peeling off the intermediate portion of the coating of a wire so as to expose a part of the conductor thereof, and they are classified into the following three methods. A first method comprises the steps of cutting the coating of an intermediate portion of a wire and axially separating the coatings so cut from each other so as to expose a part of the conductor therebetween. A second method, as disclosed in the official gazettes of Japanese Patent Publication No. 24441/1981, and Japanese Patent Laid-Open Nos. 58412/1986 and 8217/1991, comprises the steps of circumferentially cutting the coating of a wire at two portions that are spaced by a predetermined distance by means of a knife-type cutter, axially cutting the coating between the circumferentially cut portions, and peeling off the coating of the portion so cut. A third method comprises the step of rotating a wire brush so as to take off the coating of a predetermined portion of a wire.

The first method is common and widely used, since it is simple. However, since the separated coatings tend to slightly move back towards their original positions, it is not possible to obtain high accuracy. Moreover, since the coating gets soft when it is warm, while it gets hard when it is cold, the first method has a drawback in that the distance by which the coatings move back varies depending on the condition of the coating.

Although the second method can provide high accuracy, since the coating is mechanically cut by means of a knife-type cutter, there is a risk of excessive cutting, which results in damage of the conductor, or insufficient cutting. Furthermore, the number of processing stations for the peeling-off process is increased, which makes a processing apparatus complicated and larger, resulting in a long processing time. In addition, since tailings of the coating removed after having been cut with a knife-type cutter remain on the exposed conductor, it is troublesome to remove the tailings so remaining. On top of that, the second method has a drawback in that it cannot be used for a multicore wire in which a group of wires are disposed in parallel.

Although the third method is widly used for tape wires or the like, it is easy to damage the conductor by virtue of the rotation of the wire brush, and moreover it is troublesome to collect and remove cuttings. Furthermore, these first, second and third methods are difficult to be used for wires of small diameters and/or thin-coated wires, since the conductor is easy to be damaged or broken.

In manufacturing the above-mentioned flat multicore wires, a method is utilized that comprises the steps of primarily cutting individual wires to a predetermined length, peeling off the coating at the ends of each wire, disposing a group of wires so primarily processed in parallel in a plate-like fashion, and applying pieces of connecting tape thereover, or the steps of manually forming a group of wires that are individually cut into a parallel plate-like posture, peeling off the coating at the ends of the group of wires so formed, and applying pieces of connecting tape to finish.

In the above conventional manufacturing method of a flat multicore wire, there is no continuity in the processing process from cutting of wires to finishing, and moreover peeling off the coatings at the ends of a wire is carried out one by one, and applying pieces of connecting tape is manually carried out. This increases the processing time and manhour, resulting in low productivity. Thus, the method has a drawback in that it fails to fulfil the requirements for mass-production with high productivity.

SUMMARY OF THE INVENTION

An object of the present invention is to provide a flat multicore wire that can solve the problems inherent in the prior art and a method of forming the same wire.

Another object of the present invention is to provide a flat multicore wire that is free from bending or buckling and requires only a small magnitude of inserting force and a method of forming the same wire.

A further object of the present invention is to provide a method for forming a flat multicore wire that can improve the bonding capability between the exposed conductor formed after the coating of the flat multicore wire is peeled off and a securing tape.

A still further object of the present invention is to provide a method of peeling off the coating of a flat multicore wire with high accuracy and efficiency without inflicting any damages thereon.

A further object of the present invention is to provide a method of continuously and automatically forming a flat multicore wire.

In order to accomplish the above objects, the present invention provides a flat multicore wire in which a group of round wires are disposed in parallel in a plate-like fashion at predetermined intervals, and in which the coatings at the ends of the respective wires are equally peeled off by a slightly short distance so as to expose a part of the conductor thereof so that the exposed conductors each function as a contact portion, the flat multicore wire being characterized by an end construction in which pieces of common coating connecting tape of a slightly short length are applied on the top and bottom surfaces of the coatings adjacent to the proximal end of the exposed conductors, and in which a piece of conductor connecting tape that is separated from the coating connecting tape is applied to the underside of the exposed conductors.

A method of forming a flat multicore wire according to a first idea of the present invention comprises the steps of applying pieces of common coating connecting tape of a slightly short length on the top and bottom surfaces of the coatings at the end portion of a group of round wires, dividing the integral coatings on which the pieces of coating connecting tape are integrally applied to the front and rear half portions, sliding the front half portion forward so as to expose the conductors between the front and rear half portions, applying a piece of common conductor connecting tape on the underside of the exposed conductors separately from the piece of coating connecting tape on the rear half portion, and cutting and removing the front half portion so as to allow the exposed conductors to function as a contact portion.

It is preferable to take the steps of providing a soluble metal layer on the exposed conductors, bringing the conductors heated to a temperature equal to or more than the fusion point of the soluble metal into contact with a piece of tape comprising an insulating film, fusing the piece of tape at the portion where it is brought into contact with the heated conductors and then cooling the portion so fused so as to be solidified, thereby making it possible to secure the piece of tape to the exposed conductors via the soluble metal.

It is possible to use a soluble metal and an insulating film the respective fusion points of which exist in an approximate zone.

Moreover, a second idea of the present invention provides a method of sequentially continuously forming a flat multicore wire having at the ends thereof contact portions each comprising a group of parallel exposed conductors, said method comprising the steps of feeding forward a group of coated wires that are disposed in parallel in a plate-like fashion at predetermined intervals to a processing station where the intermediate coatings are peeled off, peeling off the coatings of the intermediate peeling-off designated portion of the group of wires so as to form the intermediate coating peeled-off portion, feeding forward the group of wires so peeled off to a connecting tape applying station, applying a piece of connecting tape which is common to the group of wires on the underside of a group of exposed conductors at the intermediate coating peeled-off portion of the underside of the group of exposed conductors and the coating-applied portion, feeding forward the group of wires so processed, cutting the group of wires at an intermediate position along the length of the intermediate coating peeled-off portion, and constructing the intermediate coating peeling-off process, connecting tape applying process and cutting process such that the group of wires can be continuously processed while being fed forward.

The intermediate coating peeling-off process may comprise the steps of heating the coatings of the peeling-off designated portion at the intermediate portion of the coated wires, pressing down the coating downwardly relative to the transverse direction of the wires, forming the coating peeling-off portion in which a part of the conductors is exposed in the axial direction of the wires, cutting the coating of the coating peeling-off portion by means of cutting and peeling-off knives each adapted to operate from the ends toward the center of the coating peeling-off portion, and press holding the portion so cut so as to be removed.

The same process may comprises the steps of bringing a heating jig into press contact with the upper half portion of the coating of the coating peeling-off designated portion at the intermediate portion of the coated wires, pressing down the coating downwardly relative to the transverse direction of the wires, forming the coating peeling-off portion in which a part of the conductors is exposed in the axial direction of the wires, moving forward cutting and peeling-off knives positioned to face the lower ends of the portion where the coating is peeled off so as to cut the coating of the same portion at the ends thereof, operating the cutting and peeling-off knives so as to approximate to each other in the axial direction to thereby press hold the coating so cut for peeling off, and opening the cutting and peeling-off knives so as to allow the tailings of the coating so peeled off to fall down for removal.

Alternatively, the flat multicore wire may be sequentially continuously manufactured by providing an electricity conductive soluble metal layer on the outer circumference of the exposed conductors of the portion where the coating is to be peeled off, heating the exposed conductors to a temperature equal to or more than the fusion point of the soluble metal, supplying a piece of securing tape comprising a heat-soluble insulating film to the underside of the exposed conductors so as to be brought into contact therewith, fusing the piece of securing tape at the portion where it is brought into contact with the soluble metal layer and exposed conductors and then cooling the portion so fused so as to be solidified, securing the piece of securing tape to the exposed conductors via the soluble metal layer, and cutting an intermediate position along the length of the intermediate portion where the coating is to be peeled off.

It is preferable to press process a group of exposed conductors of the round wires after forming an intermediate coating peeled-off portion so as to make the exposed conductors flat substantially along the full length thereof or at an intermediate portion along the length thereof.

BRIEF DESCRIPTION OF THE DRAWINGS

FIGS. 3 to 10 show a process of forming the flat multicore wire of the present invention, wherein FIGS. 3, 5, 7, 9 are plan views, while

FIGS. 11(A-C) is an explanatory illustration showing a securing process of the conductor of the wire to a piece of tape;

FIGS. 17 (A), (B), and FIGS. 18 (A), (B) are plan views of the contact portions of wires obtained by means of the apparatus shown in FIG. 16.

DETAILED DESCRIPTION OF THE PREFERRED EMBODIMENTS

Figure 1:
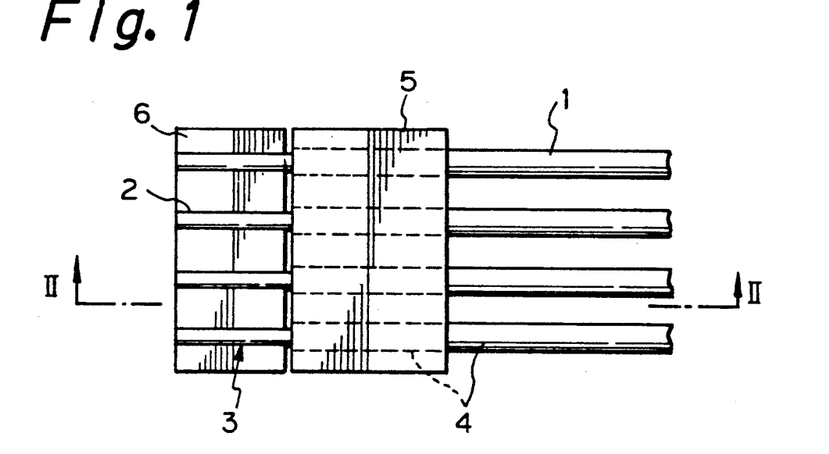
FIG. 1 is a plan view showing a basic construction of a flat multicore wire according to the present invention.
Figure 2:
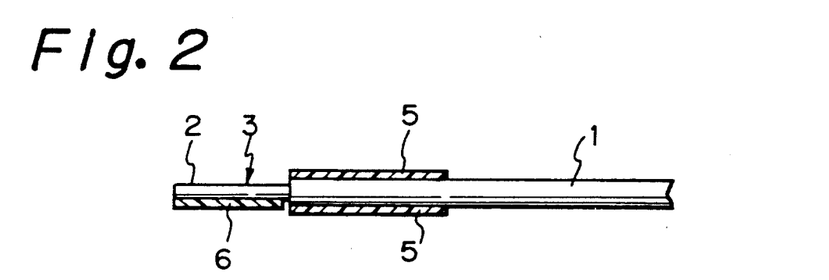
FIG. 2 is a longitudinal sectional view taken along the line II—II of FIG. 1.

As shown in FIGS. 1 and 2, in a flat multicore wire according to the present invention, a group of round wires 1 are disposed in parallel on a plane at predetermined intervals, and coatings 4 of the wires are equally peeled off by a slightly short distance at the end portions thereof so as to expose conductors so that they each function as a contact portion 3. A piece of common coating connecting tape 5 of a slightly short length is applied, respectively, to the top and bottom surfaces of the coatings 4 at a position adjacent to the proximal end of the exposed conductors 2. A piece of conductor connecting tape 6 is applied to the underside of the exposed conductors 2 separately from the piece of coating connecting tape 5.

Figure 3:
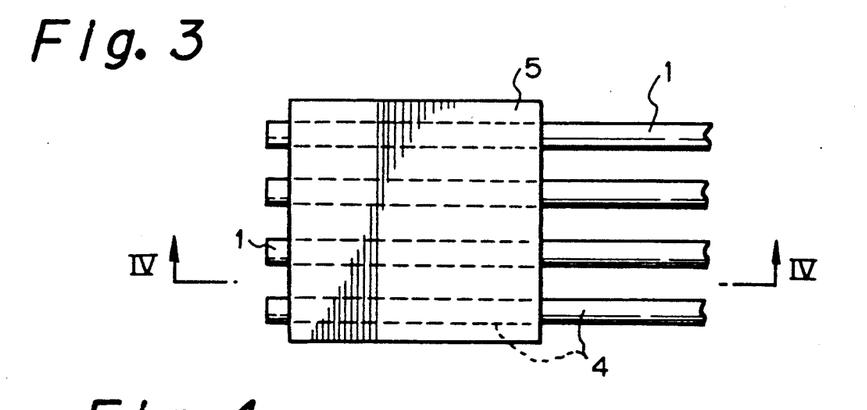
Figure 4:
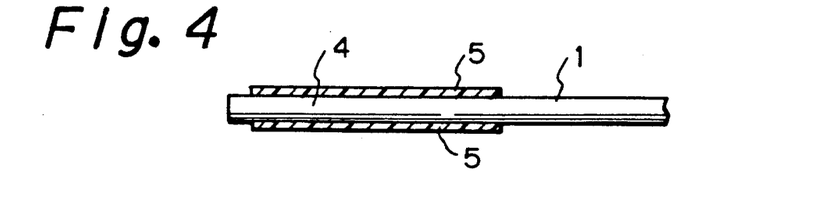
FIGS. 4, 6, 8, and 10 are longitudinal sectional views taken along the lines of IV—IV of FIG. 3, VI—VI of FIG. 5, VIII—VIII of FIG. 7, and X—X of FIG. 9, respectively.
Figure 5:
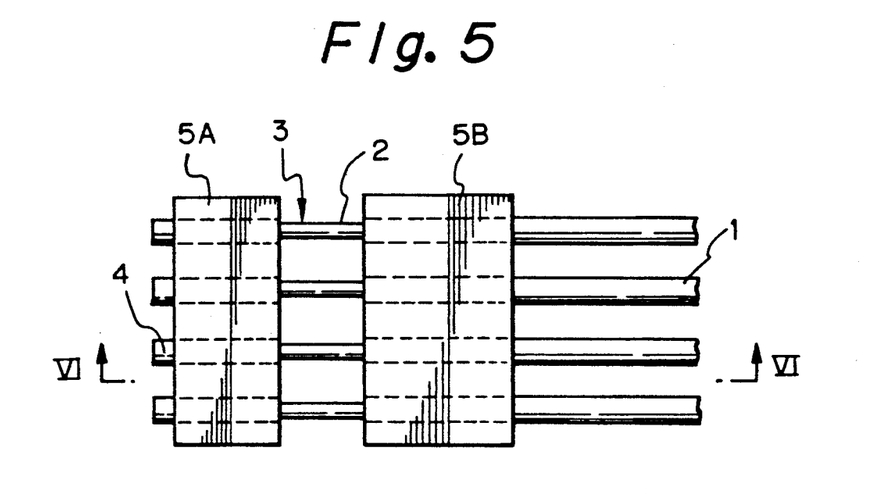
Figure 6:
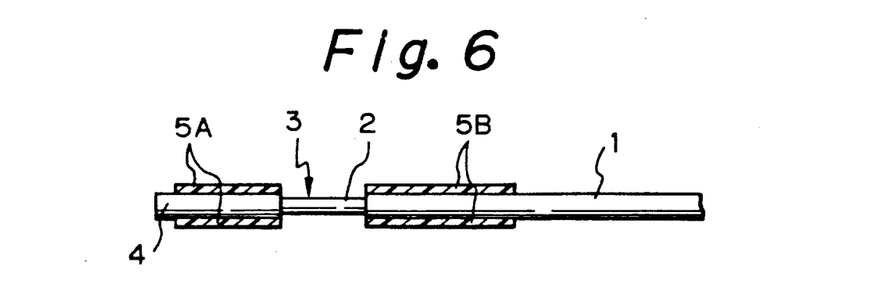
Figure 7:
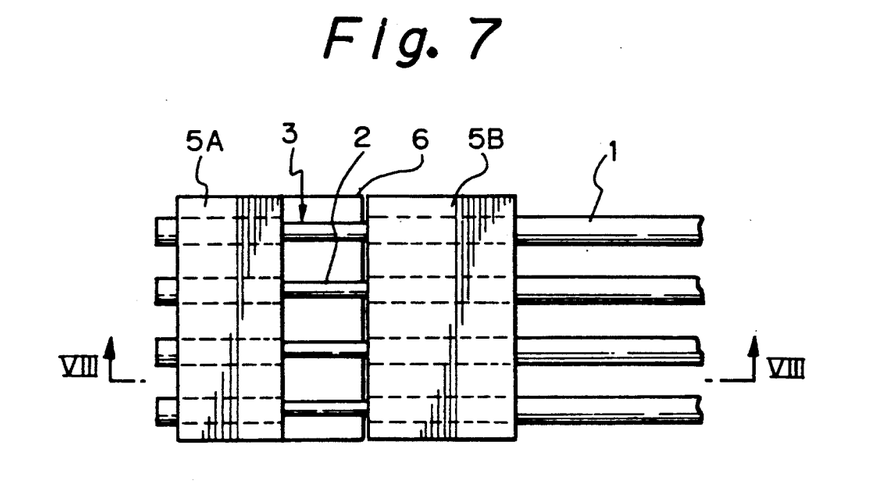
Figure 8:
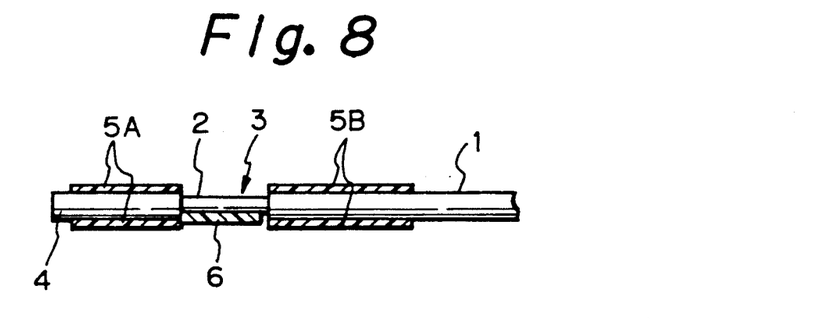
Figure 9:
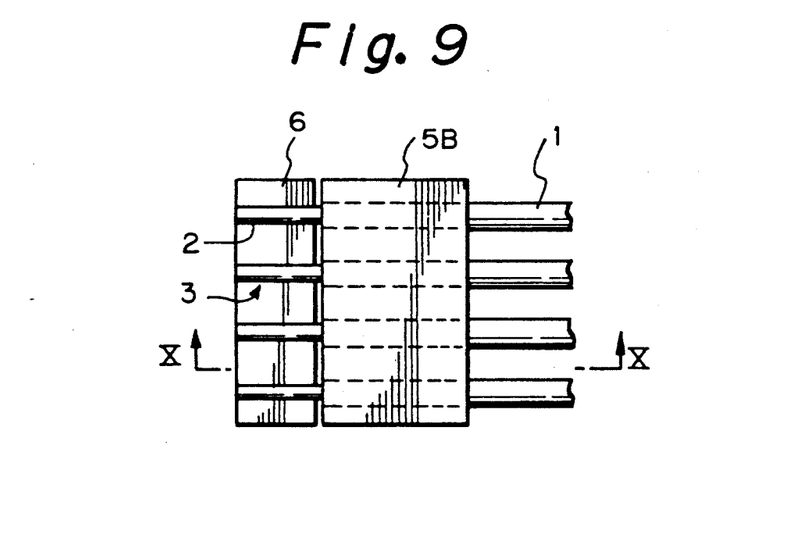
Figure 10:
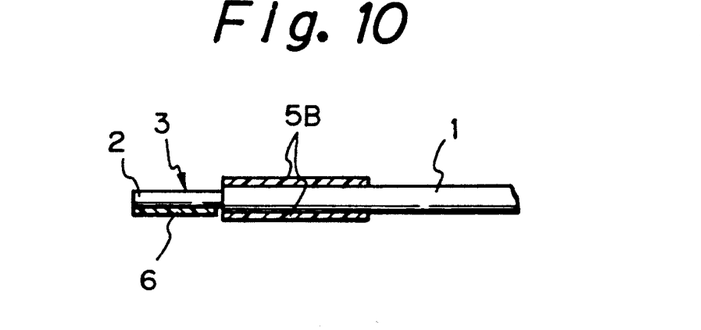

Referring to FIGS. 3 to 10, a procedure of forming the flat multicore wire according to the present invention will now be described. A piece of common coating connecting tape 5 of a slightly short length is applied, respectively, to the top and bottom surfaces of coatings 4 of a group of round wires at the end portions thereof (FIGS. 3, 4). The coatings 4 and pieces of coating connecting tape 5 integrally applied thereto are divided into a front half portion 5A and a rear half portion 5B, and the front half portion 5A is slidingly moved forward so as to expose conductors 2 between the front 5A and rear 5B half portions (FIGS. 5, 6). A piece of common conductor connecting tape 6 is applied to the underside of the exposed conductors 2 separately from the coating connecting tape 5 applied to the rear half portion 5B (FIGS. 7, 8). The front half portion 5A is cut away so that the remaining exposed conductors 2 that project forward each function as a contact portion 3 (FIGS. 9, 10).

The front half portion 5A and rear half portion 5B are divided by using a known means for peeling off the coating of a wire, and only the front half portion 5A is slidingly moved forward by a slightly short distance so as to expose the conductors 2. The front half portion 5A and rear half portion 5B are not necessarily divided into two, and the size of the front half portion 5A that is slidingly moved forward may be such that it sufficiently retains the aligned posture of the exposed conductors 2.

With the flat multicore wire having the above-mentioned end structure, since the group of round wires 1 are held at a position adjacent to the exposed conductors 2 by means of the pieces of coating connecting tape 5 applied thereto so as to be connected and secured to each other, while the separate piece of conductor connecting tape 6 is applied to the underside of the exposed conductors 2 separately from the piece of coating connecting tape 5 so as to be connected to and held each other, it is possible to obtain good mechanical stability of the aligned posture between the group of round wires 1 at the proximal end of the exposed conductors 2 and the exposed conductors themselves, and even if insertion resistance is generated at the exposed conductors 2, i.e. the contact portions 3, when the contact portions 3 are inserted into a connector, "disintegration of the parallel posture, bending and bucking" of the contact portions 3 can be prevented. Moreover, since the coating connecting tape 5 and conductor connecting tape 6 that function to stabilize those postures are constructed such that they are separated from each other, as described above, it is possible to suitably maintain the degree of freedom of bending of the exposed conductors 2 at the proximal end thereof, thereby making it possible for the contact portions 3 to be inserted into a connector more easily and accurately.

In addition, since stranded conductors can be employed due to the improvement of the stability of the contact portions 3, the flexibility of the entire flat multicore wire including the contact portions 3 is improved.

Furthermore, according to the forming method of the present invention, since the pieces of coating connecting tape 5 applied to the top and bottom surfaces of the coatings 4 of the wires at the end portions thereof and the coatings 4 themselves are integrally divided into the front half portion 5A and the rear half portion 5B, with the front half portion 5A being slidingly moved forward so as to expose the conductors, and since the piece of conductor connecting tape 6 is applied to the underside of the exposed conductors 2 so produced between the front half portion 5A and the rear half portion 5B, even if they are subjected to strong processing force generated for dividing and peeling off (dividing and removing the coatings) the coatings 4, the aligned posture of the group of exposed conductors 2 on the underside of which the piece of conductor connecting tape 6 is applied is maintained as it is without disintegrating the parallel posture such as a pitch between the conductors.

The above-mentioned exposed conductors 2 and the conductor connecting tape 6 may be bonded together by providing a soluble metal layer on the exposed conductors 2 instead of imparting adhesive from the outside, or by using a method for allowing metal coats provided in advance on the respective conductors to act as a securing medium. Tin, solder or the like may be used as a soluble metal, and is coated onto the outer circumference of the conductors. Polyester, polyamide (nylon 6), polyethylene or the like that can be fused by a fused substance from the above soluble metal may be used as an insulating film.

However, in order to further enhance the securing effect between the conductors and the insulating film, since it is required to quickly fuse the insulating film or the like by means of the heated conductors, it is preferable that the fusion points of the soluble metal used and the insulating film or the like exist within the approximate zone of substantially 10 or less.

In the securing method of the conductors and a piece of tape comprising an insulating film that is constructed as described above, the soluble metal layer provided on the conductors in advance is heated to a temperature equal to or more than its fusion point, and is brought into contact with the conductors and the piece of tape comprising an insulating film, and the piece of tape comprising an insulating film gets fused at a point where it is brought into contact with the heated conductor due to the temperature thereof. Thus, when the soluble metal fused to flow down on its own gravity and the fused piece of tape comprising an insulating film are joined together, the fused metal flows into the recessed portions of the piece of tape of an insulating film, or the fused soluble metal bites into the fused tape of an insulating film in a serrated fashion. When they are cooled to be solidified, a so-called known anchor effect (in other words, a fastener effect) is provided, and the conductors and piece of tape of an insulating film that are cooled to be solidified are mechanically rigidly secured together as an integral body. Thus, it is possible to obtain extremely rigid and stable securing force which is free from any decrease in the estimated application environment for a tape-like wire or the like.

As is clear from the above, in bonding the conductors to the piece of tape of an insulating film, there is no need to impart adhesive from the outside, because the metal coats themselves on the conductors function as a securing medium. Moreover, in order to accomplish bonding of the two members, the conductors only have to be heated and then cooled so as to be solidified. Thus, it is possible to accomplish the bonding through a short-time treatment and a simple process.

Figure 11A:
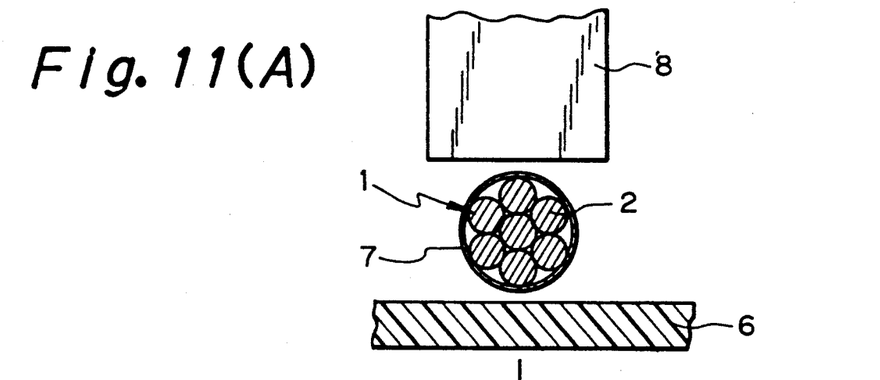
Figure 11B:
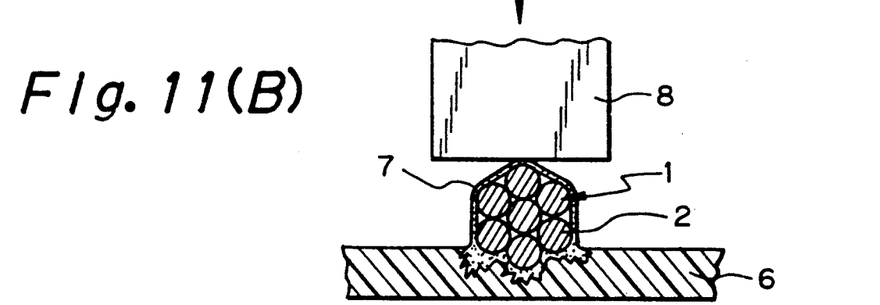
Figure 11C:
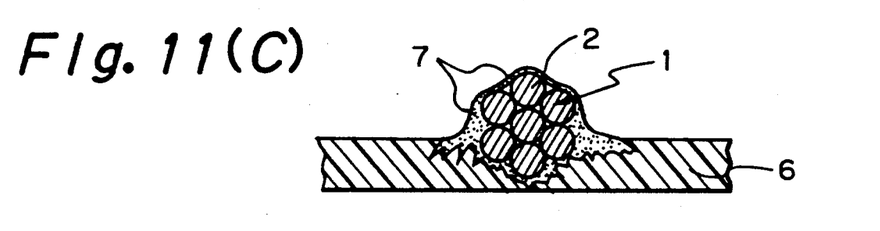

An embodiment of the method according to the present invention will be described in detail below. Referring to FIG. 11 showing a processing method and a mode of securing according to one embodiment of the present invention, a tin coat 7 (whose fusion point is 238° C.) is provided on the outer circumference of a conductor 2 comprising seven wires that are coaxially stranded so as to function as a soluble metal layer. A piece of tape 6 of an insulating film to which the conductor 2 is to be secured is made from polyester (whose fusion point is 45° C.). The fusion points of the two members are in an approximate zone relationship.

The above conductor 2 is secured to the tape 6 of an insulating film by using the following process. The conductor 2 is placed on the tape 6 of an insulating film, and they are set such that the outer circumference of the conductor 2 is brought into contact with the tape 6 of an insulating film. A heat plate 8 that is heated to a temperature of about 300° C. is then brought into abutment with the conductor 2 so as to heat the same, and after a few seconds, the heat plate 8 is removed from the conductor 2 so as to allow it to be naturally cooled, whereby the conductor 2 is secured on the tape 6 of an insulating film.

According to the above embodiment, the tin coat 7 provided on the conductor 2 so as to act as a soluble metal layer is fused to flow down at its own gravity immediately the heat plate 8 is brought into abutment with the conductor 2 and the tape 6 of an insulating film comprising polyester having a fusion point approximate to that of the tin coat 7 is then fused at a position where the tape 6 is joined to the soluble metal layer due to the heat applied to the conductor 2 as well as the fused substance flowing down on its own gravity. Moreover, when the fused substance from the tin coat 7 sequentially flows down to the fused portion of the tape 6 of an insulating film, those fused substances bite into each other in a serrated fashion so as to be joined together, and they are cooled as they are so as to provide a securing mode in which the anchor effect is obtained, the conductor 2 and the tape 6 of an insulating film being thereby mechanically rigidly jointed together as an integral part.

In order to further enhance securing force between the conductor 2 and the tape 6 of an insulating film according to the present invention, when the heat plate is heated to heat the conductor, it is effective to impart a slightly small magnitude of pressure to the heat plate 8 so as to promote fusing of the tape 6 of an insulating film, or to increase the amount of the soluble metal layer so as to increase as wide as possible the spreading width in which the fused substance of the soluble metal spreads over the top surface of the insulating film.

Figure 12:
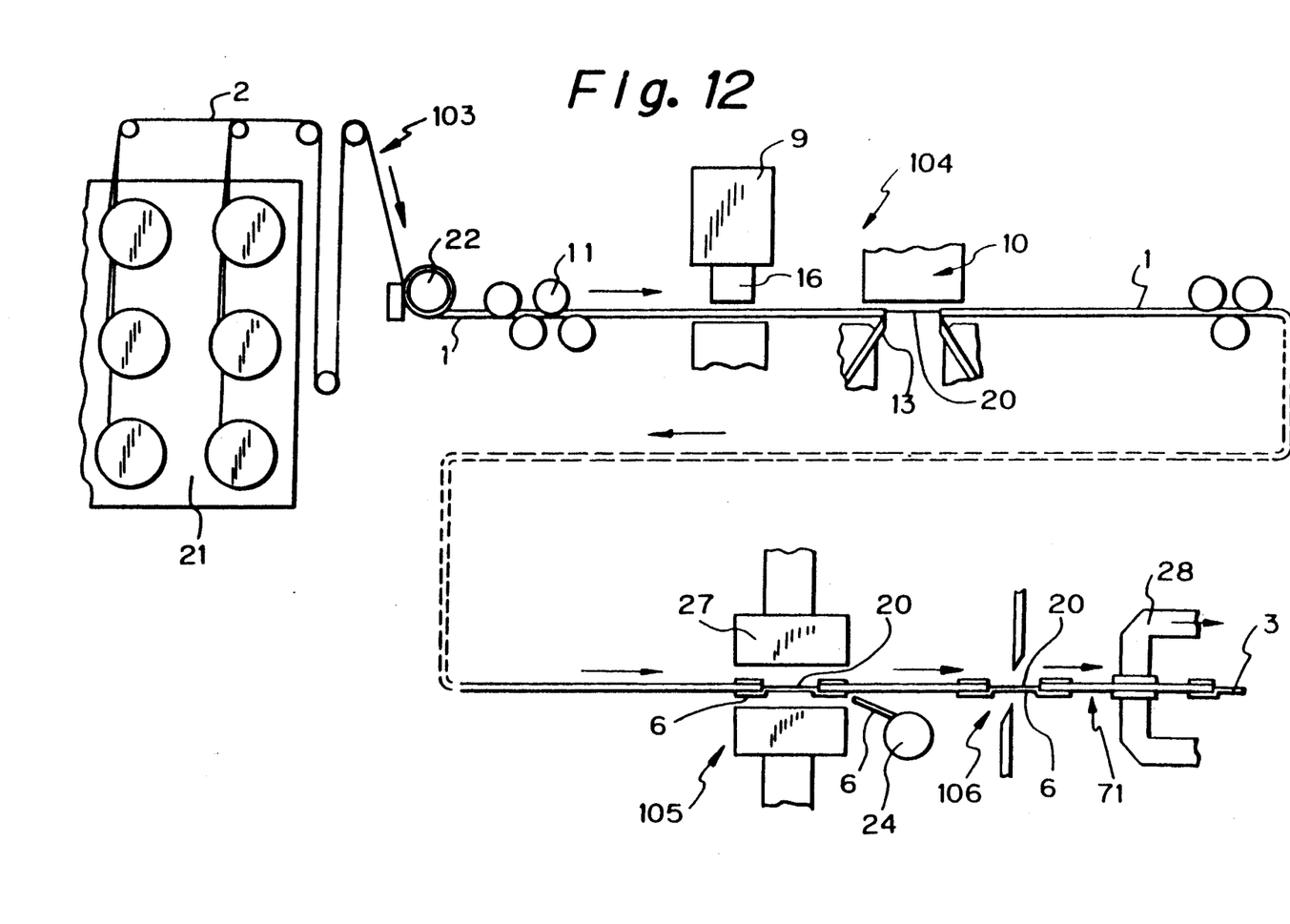
FIG. 12 is a schematic illustration showing the entire structure of an apparatus for use with the method according to the present invention.

Referring to FIG. 12, an apparatus used when carrying out the method of forming the flat multicore wire according to the present invention will be described below. This apparatus comprises a wire feeding section 103, an intermediate peeling-off section 104, a connecting tape applying section 105 and a cutting section 106, which are continuously disposed in series in that order.

A group of a predetermined number of wires 1 that are arranged in a parallel plate-like posture at predetermined pitches are fed forward from the wire feeding section 103 at a constant speed, and the coatings of the intermediate coating peeling-off designated portion of the group of wires 1 are peeled off at the intermediate coating peeling-off section 104 placed at an intermediate position along the length of the processing line so as to form an intermediate coating peeled-off portion 20 where the conductors 2 are exposed around their entire circumference. Following this, a piece of connecting tape 23 is applied to the coating peeled-off portion at the connecting tape applying section 105 to thereby secure the parallel posture of the group of wires. Afterwards, the group of wires 1 are fed forward to the cutting section 106, where they are cut at a central position of the intermediate coating peeled-off portion 20, whereby a flat multicore wires 71 having at the ends thereof a contact portion 3 comprising a group of exposed conductors of a predetermined length are sequentially continuously manufactured.

To be specific, at the wire feeding section 103, a necessary number of coated wires 1 are arranged in parallel in a plate-like fashion at an arbitrary pitch ranging from 2.5 to 3.5 mm, and are fed forward altogether to the next processing section by means of rollers 11. In addition, the wire feeding section 103 of this embodiment has a construction in which conductors 1 pulled out of a conductor feeding section 21 are fed through a coating processing section 22 where the conductors are coated so as to be formed into coated wires 1, which are then fed to the next processing section. Thus, the present invention provides a full automatic manufacturing apparatus in which the manufacturing process starting with the feeding of conductors 2 to the completion of wires is automatically carried out.

Figure 13:
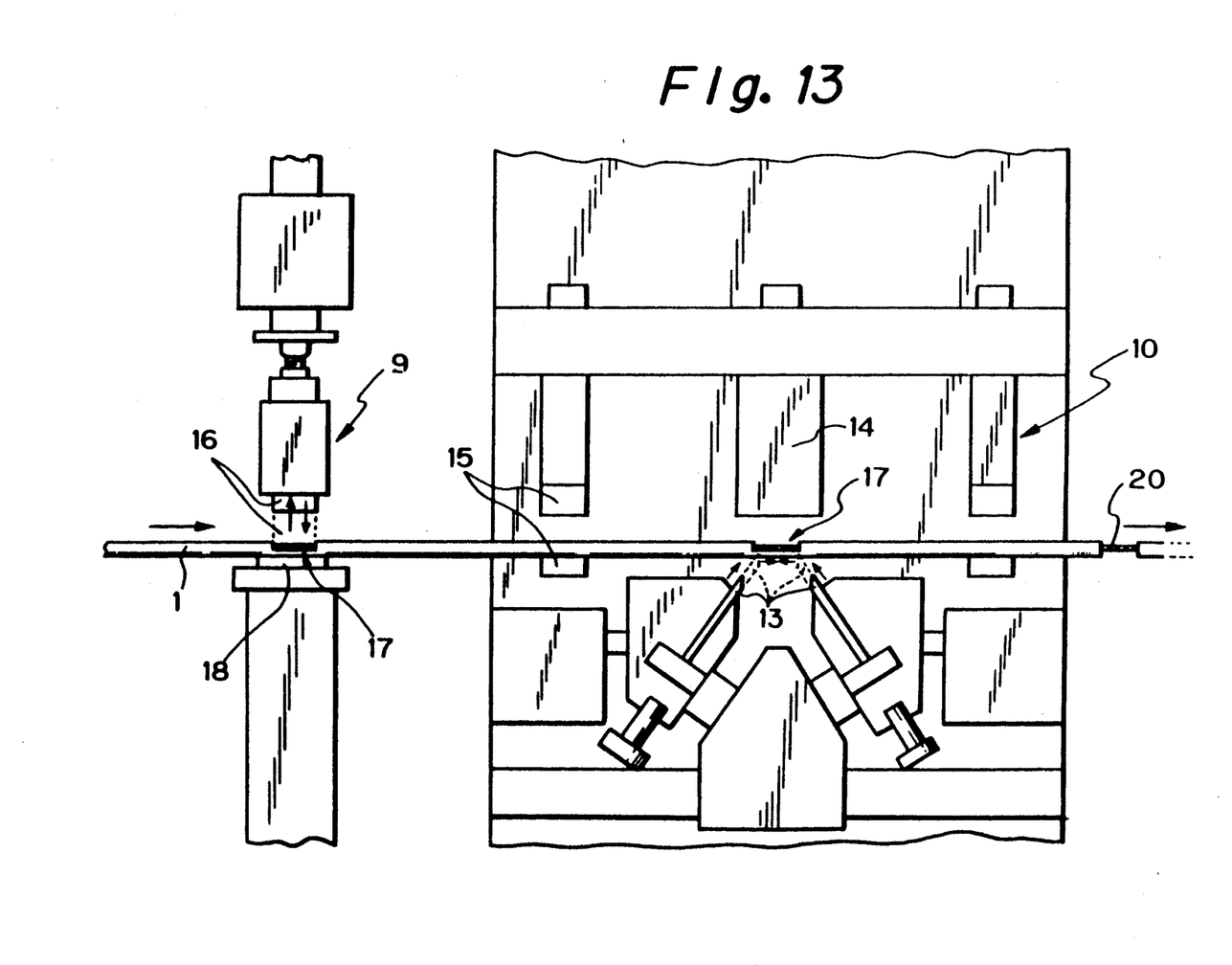
FIG. 13 is a side view of a processing unit for peeling off an intermediate coating.

Next, the intermediate coating peeling-off section 104 is divided into a front processing section 9 for heating coatings and a rear processing section 10 for peeling off the coating of a heated protion. As shown in FIG. 13, the front processing section 9 is constructed such that a temperature adjustable heat plate 16 that is to be brought into abutment with a heating jig is vertically removably provided above a pedestal portion 18, that the heat plate 16 that is heated to a predetermined temperature is caused to descend so as to be brought into press contact with the wires 1 being laid on the pedestal portion 18, and that the coatings of the coating peeling-off designated portion is pressed downwardly while being heated to be softened so as to form an exposed portion 17 where a part of the conductor 1 is exposed.

The rear processing section 10 has a pair of clamps 15 for retaining wires 2, while being laid, that are fed forward from the front processing section 9, and a wire presser plate 14 disposed between the pair of clamps 15. A pair of cutting and peeling-off blades 13 are symmetrically set below the ends of the exposed portion 17 of the wires clamped by means of the pair of clamps 15 in such a manner that the leading ends thereof face the wires so laid. This pair so cutting and peeling-off blades 13 are adapted to simultaneously advance to cut the lower half portion of the ends of the exposed portion 17, and then to operate such that they approach each other as shown in dotted lines, and during this approaching operation, the blades 13 are designed to hold and press therebetween the coatings of the exposed portion 17 from the ends thereof where cutting has already been made, whereby the coatings are peeled off. Thus, the intermediate coating peeled-off portion 20 where the entire circumferential coating is peeled off is formed. A peeled-off coating (coating tailings) held by means of peeling-off blades 13 is caused to fall down on its own gravity when the blades 13 are opened. In addition, U-shaped grooves are formed in parallel in the tips of the cutting and peeling-off blades 13 so that the coatings of the wires are individually cut, thereby making it possible to simultaneously process a group of wires.

The above front processing section 9 and rear processing section 10 of the intermediate coating peeling-off section 104 each constitute a processing station, and the group of wires 1 are temporarily stopped at these stations so that the coatings at a predetermined position of the peeling-off designated portion is peeled off. This peeling off process will be described with reference to FIGS. 14(A) to 14(I).

Figure 14A:
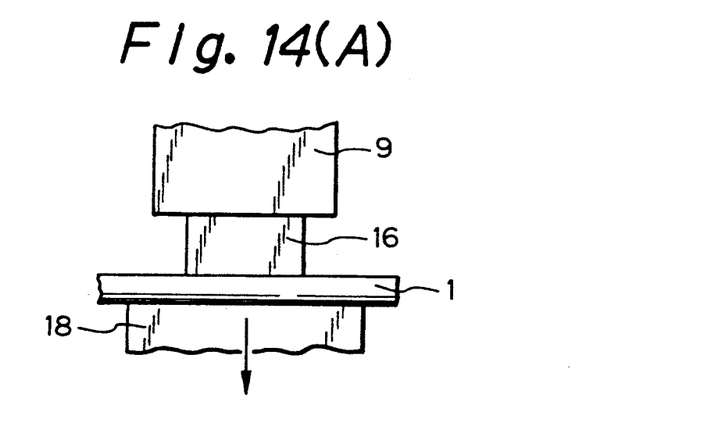
FIGS. 14(A) to (I) are explanatory illustrations of an intermediate coating peeling-off process.
Figure 14B:
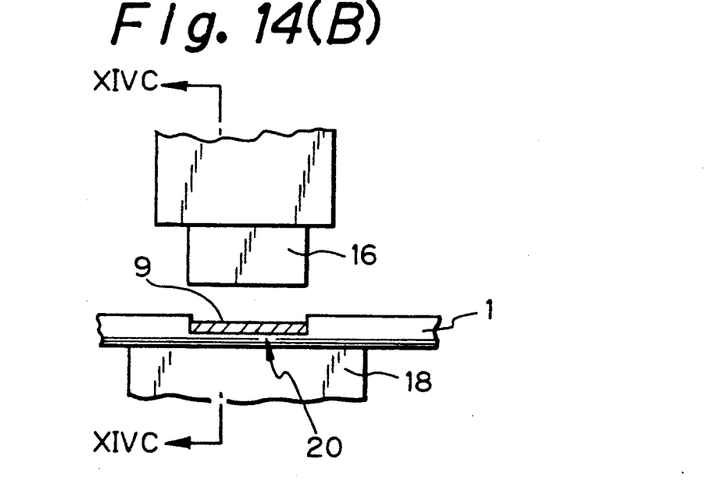
Figure 14C:
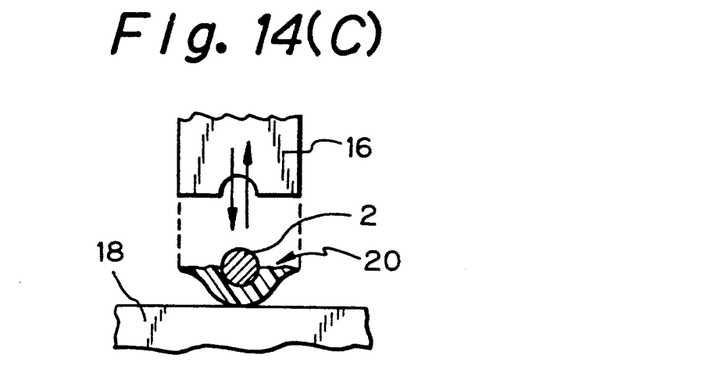
Figure 14D:
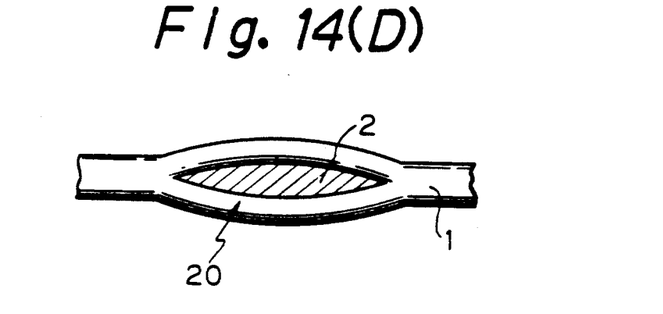

As shown in FIGS. 14(A), (B), in the front processing section 9, the heat plate 16 the length of which is substantially the same as that of the portion of the coatings of the wires 1 that are to be peeled off is heated to a temperature of 300° C., and this heated heat plate 16 is then brought into press contact with the axial top edges of the wires 1 fed to the pedestral portion 18 so as to heat the same edges, whereby the coatings at those portions are made soft and are eventually fused, thereby making it possible to press down the coatings so processed downwardly relative to the transverse direction of the wires 1. As shown FIGS. 14(C), (D), the upper half portion of the conductor 2 is exposed by a predetermined distance in the axial direction of the wires 1, and the coating of the upper half portion is then pressed downwardly so as to form a coating peeled-off portion 20 comprising a group of projecting conductors 2.

Figure 14E:
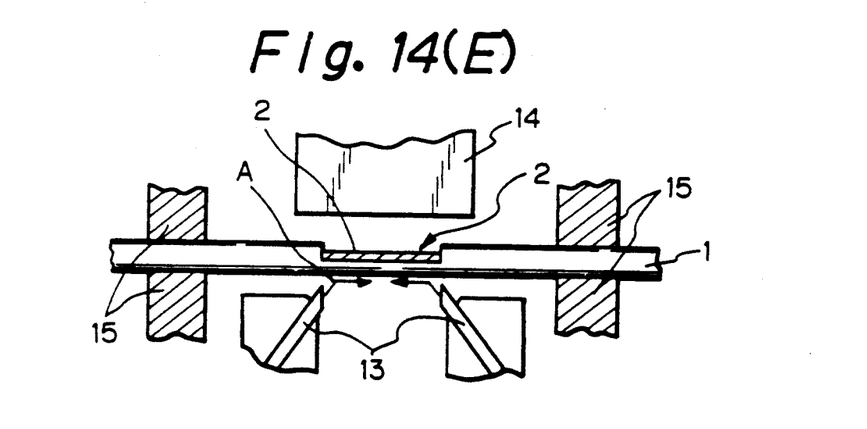
Figure 14F:
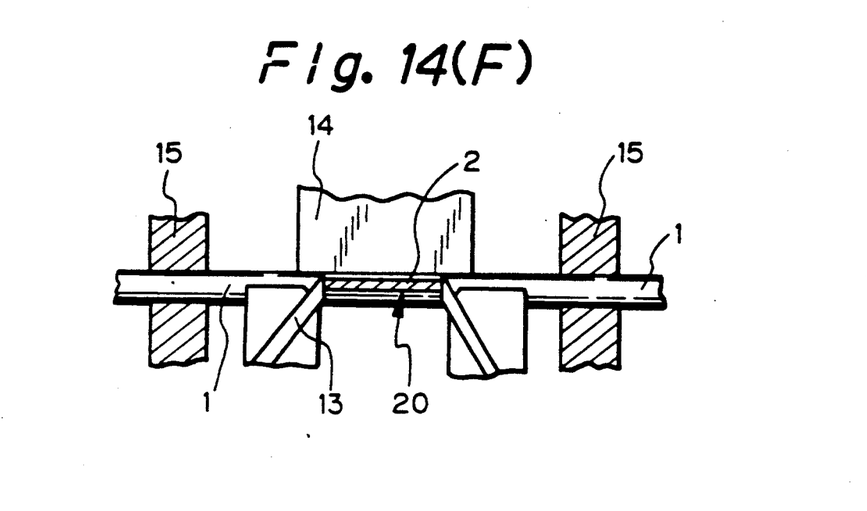

The group of wires 1 are next fed forward to the rear processing section 10, and as shown in FIGS. 14(E), (F), the group of wires 1 are clamped and held by the clamps 15 with the exposed conductors 2 being faced upward. Following this, the presser plate 14 is lowered so as to secure the upper portion of the wires 1, and the cutting and peeling-off blades 13 are each operated to move in the direction indicated by an arrow A, whereby the blades approach each other so as to remove the coatings of the coating peeled-off position 20.

Figure 14G:
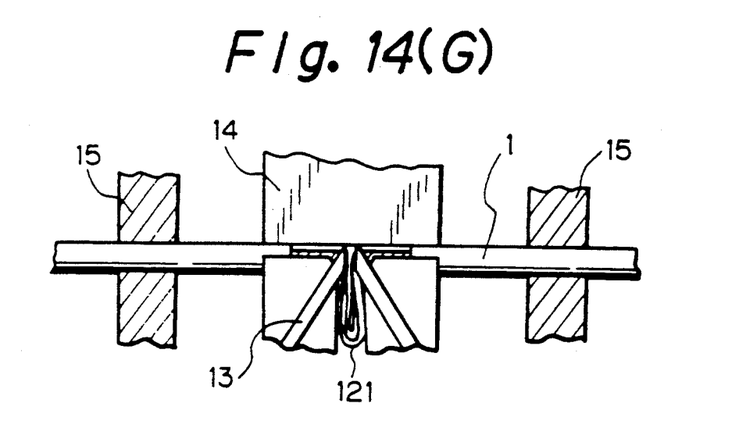
Figure 14H:
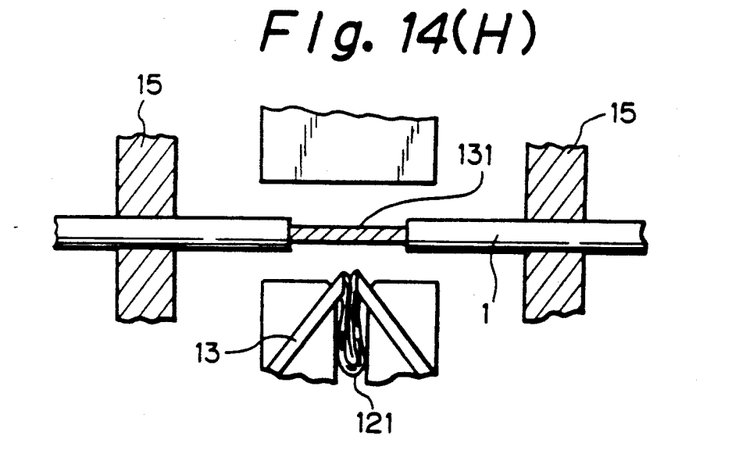
Figure 14I:
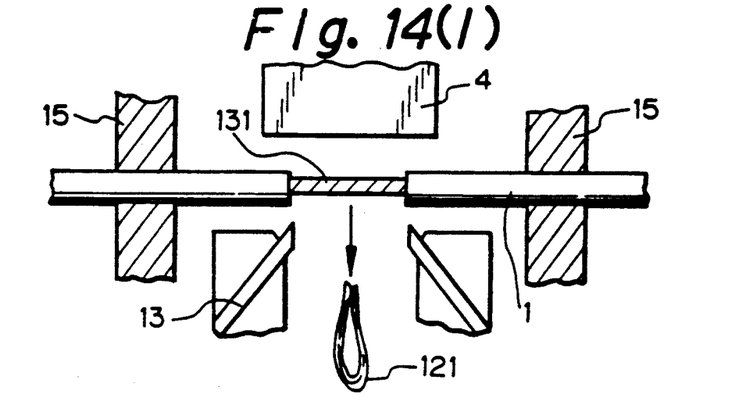

Afterwards, as shown sequentially in FIGS. 14(G) to 14(I), the lower half portion of the coating peeled-off portion 20 is cut at the ends thereof by advancing the cutting and peeling-off blades 13, and then the blades 13 are operated so as to approach each other with the coating of the coating peeled-off portion 20 that is cut at the ends thereof being held therebetween, whereby the respective coatings are removed so that the conductors 2 of the coating peeled-off portion 20 are fully exposed. Thus, when this second process has been completed, coating peeled-off portions 131 of a predetermined length are simultaneously formed at an intermediate position along the length of the group of wires 1.

The cutting and peeling-off blades 13 are lowered with the coating trailing 121 held therebetween, and when they are opened, the coating trailing 121 falls down on its own gravity for collection. Afterwards, the cutting and peeling-off blades 13 are restored to its original position shown in FIG. 14(F) for another cutting and peeling-off cycle.

Following this, the group of wires 1 having the intermediate coating peeled-off portion 20 thus formed are then fed forward to the connecting tape applying 105 section, where the group of wires 1 are again temporarily stopped at this processing station. When the group of wires are temporarily stopped there, a piece of connecting tape 6 cut from a tape roll 24 is supplied to the underside of the intermediate coating peeled-off portion 20 via a means for cutting and supplying pieces of tape of a predetermined amount similar to a known wire tape take-up machine, and the piece of connecting tape 6 so supplied is automatically applied to the underside of the wires at the intermediate coating peeled-off portion 20, as well as the portions adjacent thereto via a applying means such as an applying press 27, whereby the parallel posture between the group of conductors 2 and the group of wires 1 at the intermediate coating peeled-off portion 20 is entirely secured.

The group of wires whose parallel posture is thus secured are then fed forward to the cutting section 6 so as to be cut at a central portion of the intermediate coating peeled-off portion 20. In this manner, the flat multicore wires 71 having wires whose parallel posture is secured and contact portions 3 comprising exposed conductors of a slightly short length are sequentially continuously manufactured. In the drawing, reference numeral 28 denotes arms for removing the flat multicore wires 71 so completed.

In addition to the above tape applying mode in which a piece of connecting tape 6 that is common to the group of wires is applied to the under side of the exposed conductors and the part of the coated portion so as to integrally secure those portions, another tape applying mode may be used at the connecting tape applying section 105 in which separate pieces of connecting tape are applied to the undersides of the exposed conductors and the coated portion adjacent to the exposed conductors, or in which a piece of connecting tape is applied to the coated portion only at positions adjacent to the exposed conductors with the same conductors being free from any connecting tape. Thus, various tape applying modes may be utilized.

Figure 15:
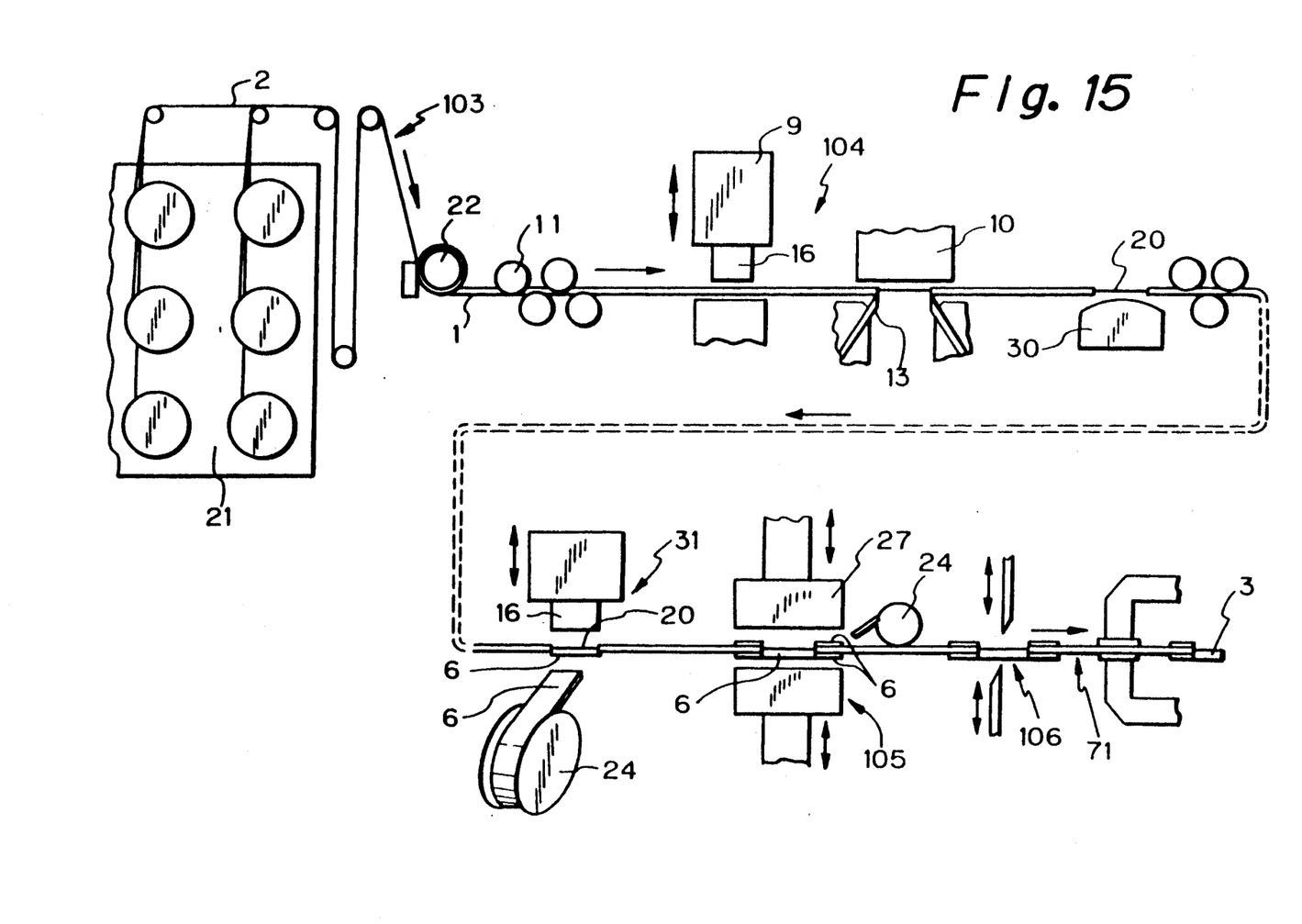
FIG. 15 is a schematic illustration showing the entire structure of an apparatus for use with another method according to the present invention.

Next, the apparatus having a unit for applying a soluble metal layer described with reference to FIG. 11 is shown in FIG. 15. A manufacturing apparatus employing this embodiment comprises a wire feeding section 103, intermediate coating peeling-off section 104, a connecting tape applying section 105, and a cutting section 106 which are the same as those used in the embodiment shown in FIG. 12, and additionally comprises a solder applying section 30 and a conductor tape securing section for securing the conductors 2 and the securing tape 6, both of which are disposed downstream of the intermediate coating peeling-off section 104.

As shown in FIG. 11, stranded wires are used for conductors 2, and after an intermediate coating peeled-off portion 20 is formed, a soluble metal layer 7 of electricity-conductive heat-soluble metal is applied and formed on the conductors 2 at the intermediate coating peeled-off portion 20. As the next processing station i.e. the conductor tape securing section 30, a piece of securing tape 6 is supplied to the underside of the exposed conductors 2, and the heat plate 8 is lowered onto the conductors 1 so as to heat the exposed conductors so that the soluble metal layer 7 and the securing tape 6 are fused. Being cooled, the fused layer and tape are rigidly secured to each other so as not only to secure the parallel posture of the stranded-wire conductors but also to reinforce the stranded conductors themselves.

The intermediate coating peeled-off portion 20 is securely formed through this conductor tape securing means. Furthermore, the posture of the group of wires 1 whose stranded-wire conductors have been reinforced is stabilized by applying pieces of connecting tape 6 to the coated portions at positions adjacent to the intermediate coating peeled-off portion 20 at the securing tape applying section 105. Afterwards, the group of wires 1 are cut at a central position of the intermediate coating peeled-off portion 20 at the cutting section 106, a flat multicore wire comprising stranded-wire conductors being thus formed. As to the soluble metal layer 7 and the securing tape 6, a combination of tin coat and polyester tape may alternately be used.

In the flat multicore wire of this embodiment, since the mechanical properties of the stranded-wire conductors as a contact portion are impoved by means of the above connecting tape 6, disintegration of wires and bending both inherent in a contact portion of a stranded conductor are prevented, this enabling a stranded-wire conductor to be used in a flat multicore wire, which in turn enables a flat multicore wire to be used for curved wiring, as well as for movable wiring in which wires are repeatedly bent while in use.

Figure 16:
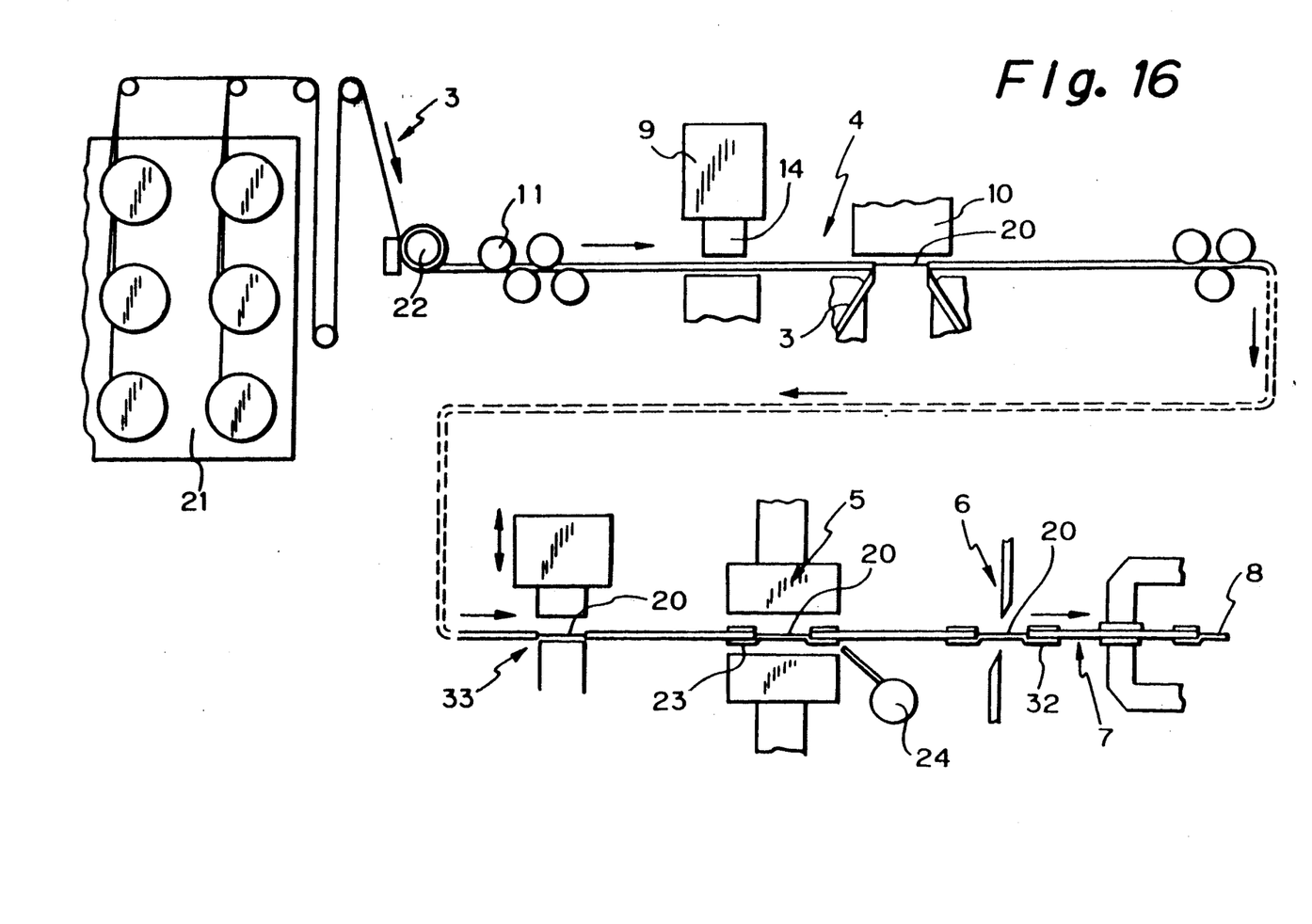
FIG. 16 is a schematic illustration showing the entire structure of an apparatus for use with a further method according to the present invention.
Figure 17A:
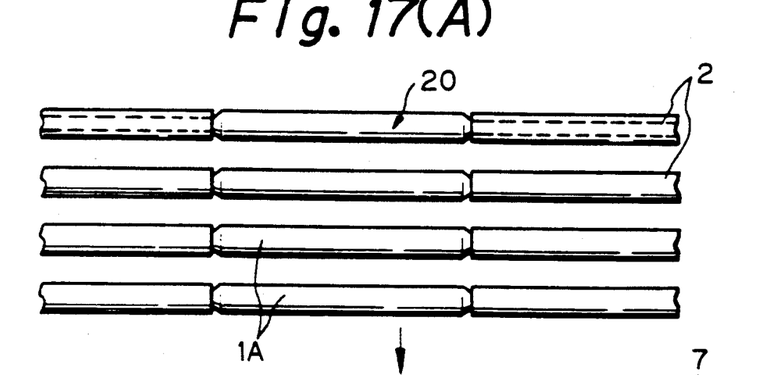
Figure 17B:
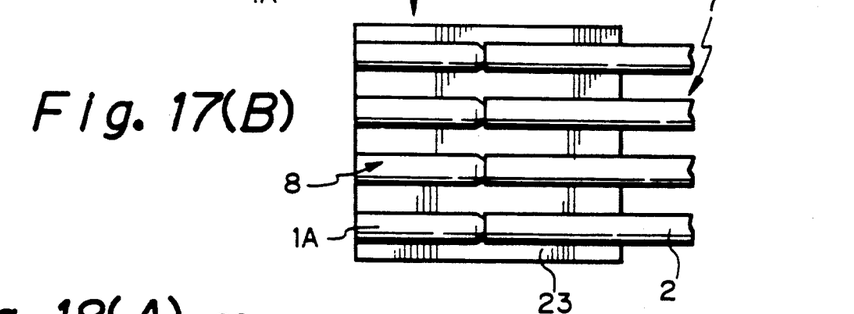
Figure 18A:
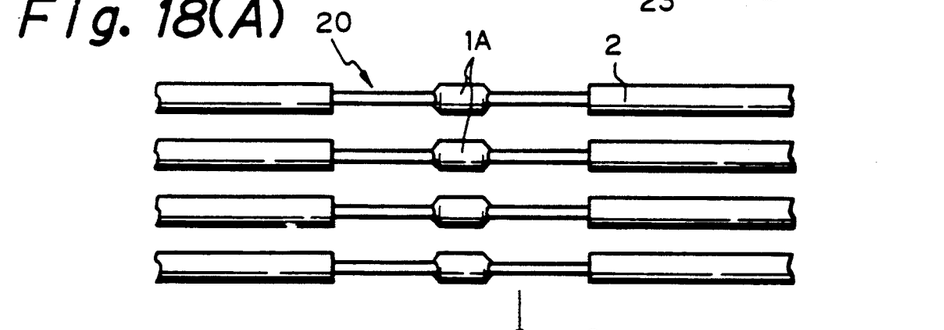
Figure 18B:
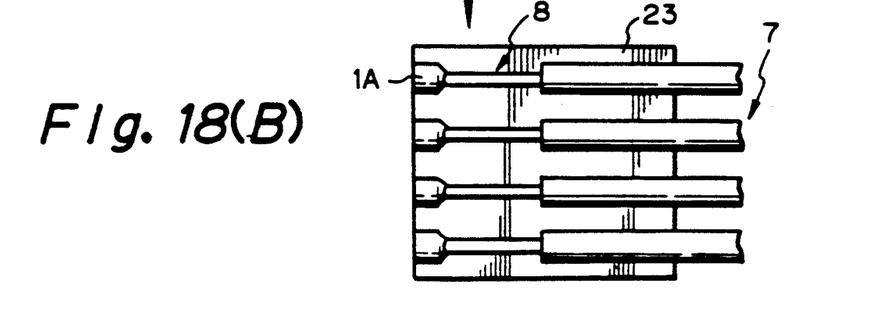

Next, referring to FIG. 16, a further embodiment of the present invention will be described. A manufacturing apparatus employing this embodiment comprises a wire feeding section 103, intermediate coating peeling-off section 104, a connecting tape applying section 105, and a cutting section 106 which are the same as those used in the embodiment shown in FIG. 12, and additionally comprises a conductor press section 33 for flatting the conductors 1 provided downstream the intermediate coating peeling-off section 104. The round conductors 2 exposed at the intermediate coating peeling-off section 104 are pressed so that substantially the whole of the exposed conductors 2 or the intermediate portion thereof is vertically compressed and flatted to be formed into a flat conductor 2A as shown in FIGS. 17(A), (B), and FIGS. 18(A), (B). A piece of connecting tape 6 is also applied to this flat conductors 2A at the connecting tape applying section 105, and the wires are cut at a central position of the intermediate coating peeled-off portion 20 at the cutting section 6, a flat multicore wire being thus formed. In the flat multicore wire 71 formed according to this embodiment, since the exposed conductors of the contact portions 3 at the ends are flatted along the full length thereof or at the leading end thereof, a wide bonding surface to be bonded to the securing tape can be provided and therefore securing capability is improved. Furthermore, this improvement in the contact surface improves the electricity conductivity, and the insertion of the contact portions 3 into an associated element is facilitated.

As is described above, the flat multicore wire according to the present invention is advantageous in that "stability and resonable degree of freedom of bending" can be provided at the contact portions, and that the connecting efficiency of the contact portions to a connector can be improved. Furthermore, this embodiment advantageously makes it possible for a flat multicore wire to be used for a two-dimensional connecting and movable connecting where wiring is repeatedly bent at intermediate positions along the length thereof due to the improvement of flexibility provided by use of stranded-wire conductors. In addition, the flat multicore wire forming methods according to the present invention provide the flat multicore wire having the above-mentioned functional advantages, while improving the quality by securing the aligned posture of the contact portions.

Physically strong and rigid securing force can be obtained in securing the conductors of round wires and a piece of tape of an insulating film, and since securing force does not decrease as long as an environmental temperature does not reach the fusion points of the tape used and soluble metal functioning as a securing medium, stable securing force can be assured in an estimated application environment for tape-like wires, superior securing performance being thus provided. Furthermore, since the securing process is simple and quick to be performed only by suing simple tools such as the above-mentioned heat plate or the like, this embodiment is also practically effective in that securing costs can be decreased that superior productivity can be provided.

Moreover, with the flat multicore wire forming methods according to the present invention, since a series of wire processing from feeding of coated wires to finishing is sequentially continuously carried out, and since it is possible to fully automate the entire manufacturing process, forming capability and productivity of flat multicore wires can be remarkably improved, and it is possible to provide flat multicore wires of good quality, without unevenness of quality, at inexpensive costs. Furthermore, the wiring performance of flat multicore wires is improved due to high flexibility imparted to the flat multicore wire by using stranded-wire conductors, and the posture of the contact portions constituted by the exposed conductors is made stable, improving the insertability of the contact portions into an associated element, thereby making it possible to improve the quality of the flat multicore wire.

What is claimed is:

1. A flat multicore wire having a group of round wires disposed in parallel on a plane at predetermined intervals and a contact portion comprising exposed conductors produced by equally peeling off coatings of said round wires at the end portion thereof by a slightly short distance, said flat multicore wire being characterized by an end structure in which pieces of common coating connecting tape of a slightly short length are applied on the top and bottom surfaces of the coatings adjacent to the proximal end of said exposed conductors, and in which a piece of conductor connecting tape that is separate from said coating connecting tape is applied to the underside of said exposed conductors.

* * * * *